United States Patent [19]

Cord'homme

[11] 4,028,610

[45] June 7, 1977

[54] INVERTERS SUPPLYING A HIGH FREQUENCY ALTERNATING CURRENT

[75] Inventor: Edmond Cord'homme, Paris, France

[73] Assignee: Thomson-CSF, Paris, France

[22] Filed: Aug. 18, 1975

[21] Appl. No.: 605,436

[30] Foreign Application Priority Data

Aug. 22, 1974 France .............................. 74.28889

[52] U.S. Cl. ............................... 321/14; 321/45 R; 321/45 ER
[51] Int. Cl.² .......................................... H02M 1/18
[58] Field of Search ........ 321/11, 14, 45 R, 45 ER, 321/12

[56] References Cited

UNITED STATES PATENTS

| | | | |
|---|---|---|---|
| 3,487,289 | 12/1969 | McMurray | 321/45 R |
| 3,601,683 | 8/1971 | Brown | 321/45 ER |
| 3,809,963 | 5/1974 | Hutchinson | 321/11 |
| 3,835,366 | 9/1974 | Homme | 321/45 R |
| 3,881,146 | 4/1975 | Wanlass | 321/45 R |

FOREIGN PATENTS OR APPLICATIONS 196,992  12/1967  U.S.S.R. .......................... 321/45 R

OTHER PUBLICATIONS

Electronics & Power, pp. 206–209, June 1972.

*Primary Examiner*—William H. Beha, Jr.
*Attorney, Agent, or Firm*—Oblon, Fisher, Spivak, McClelland & Maier

[57] ABSTRACT

An inverter embodiment provided with an enhanced A.C. output signal frequency upper limit and with an improved circuit protection. This protection operates when the load impedance varies outside permitted limits. In the inverter the number $m$ of pairs of controlled rectifiers and inductances is made equal to $2q$, $q$ representing groups of at least two pairs, with each group having the series-connected rectifier and inductance components forming one pair connected in parallel with those forming the other pair, the rectifiers being connected to conduct in opposite directions. In addition, a fault detector is connected via an inductance to the output terminals of the DC source and further is coupled to the output which supplies the load. The value of the Q factor of the coupling means, which means are tuned to the A.C. output signal frequency, depends on the load impedance. A major increase in this impedance results in energy being returned to the source.

4 Claims, 4 Drawing Figures

INVERTERS SUPPLYING A HIGH FREQUENCY ALTERNATING CURRENT

BACKGROUND OF THE INVENTION

1. Field of the Invention

The present invention generally relates to inverters, i.e. static converters from D.C. to A.C., supplying a high frequency current.

It relates more particularly to novel arrangements of the inverter, whereby the safety in operation is considerably increased.

2. Description of the Prior Art

In a prior French Pat. No. 2,180,584 of the applicant of the present invention are disclosed and described inverters designed to supply high frequency alternating currents and which incorporate $m$ pairs of controlled rectifiers, $m$ being a whole number at least equal to 1. These rectifiers, which are connected in series, are periodically made conductive or non-conductive by applying a signal from a trigger signal generator so that each controlled rectifier in turn excites a driving resonant circuit, which supplies alternating current to a load circuit. In such inverters, the interval $T_o$ between two successive triggerings of the same rectifier is made equal to a whole-number multiple $pT$ of the period $T$ of the alternating signal produced. The number $p$ is selected to be greater than the number $m$ of pairs of rectifiers so that the period T, which corresponds to the interval between the time at which a given rectifier is triggered and that at which the next rectifier is triggered, is always greater than the half period $T/2$, which thus makes it possible for the non-conductive period $T_4$ of the rectifiers in the inverter to be increased by $p T/2 - T_3$ and the frequency of the AC output signal produced by the inverter to be increased accordingly; $T_3$ being the time during which the controlled rectifiers are conductive.

In certain applications of such inverters, for example in underwater acoustics, the load impedance into which the alternating output current feeds may be subject to considerable variations and, in the extreme case, may become of zero value, for example because of an accidental short-circuit, or may take an infinite value, for example as the result of a disconnection. Such variations have repercussions on the way in which the inverter as a whole operates, the emitted power being inversely proportional to the value of the load impedance. Such variations may thus cause faulty operation on the part of the inverter and may result in the destruction of the controlled rectifiers.

To overcome such disadvantages and to improve safety in operation, it is known, interalia from an article by R. THOMPSON entitled "An Audio-Frequency High-Power Generator Employing Silicon Controlled Rectifiers" which appeared in the IEE proceeding 1962, 19 B, pages 249 to 258 and in particular page 256 to associate with inverters auxiliary power limiting circuits which allow protection to be automatically provided for the various components of the inverters as soon as the resistive part of their load impedance reaches values of zero or infinity. This auxiliary circuit is connected in series with the source of supply current to the inverter.

BRIEF SUMMARY OF THE INVENTION

The present invention seeks chiefly to provide a protection to the inverter when the impedance value of its output load presents an accidental off nominal limits variation and which is a danger to its safe operation.

One object of the invention is to provide an inverter which is safer in operation using simple means which are coupled to the controlled-rectifier switching circuit.

In accordance with the present invention, the inverter in which means are provided to produce at its output an alternating signal of high frequency and to protect it in the event of a short circuit in the load impedance comprises a number $m$ of pairs of series connected controlled rectifiers and inductances, which $m$ is made equal to $2q$, $q$ representing groups of at least two pairs of rectifiers and each group having the rectifying and inductance elements of one pair connected in parallel with those of the other pair, the rectifiers being connected to conduct in opposite directions.

Increased protection for the inverter is obtained by virtue of the presence of an additional safety circuit.

In accordance with another aspect of the invention, the inverter protected in the event of the load becoming disconnected, comprises a detector circuit connected via an inductance to the input terminals of the DC current source, and being further connected to the inverter output circuit which supplies the generated A.C. signal to the load of the inverter by a coupling means tuned to the frequency of the signal produced and having a Q factor depending on the impedance of the load, the said detector restoring energy to the said D.C. source when the rectified voltage is higher than the voltage supplied by the D.C. source.

BRIEF DESCRIPTION OF THE DRAWING

Other features and advantages of the invention will become apparent from the following description, which is given by way of example, and with reference to the accompanying figures, which show:

FIG. 3 : a circuit diagram showing a modified embodiment of the inverter provided with protection means according to the invention.

DETAILED DESCRIPTION OF THE PREFERRED EMBODIMENTS

Figure 1:
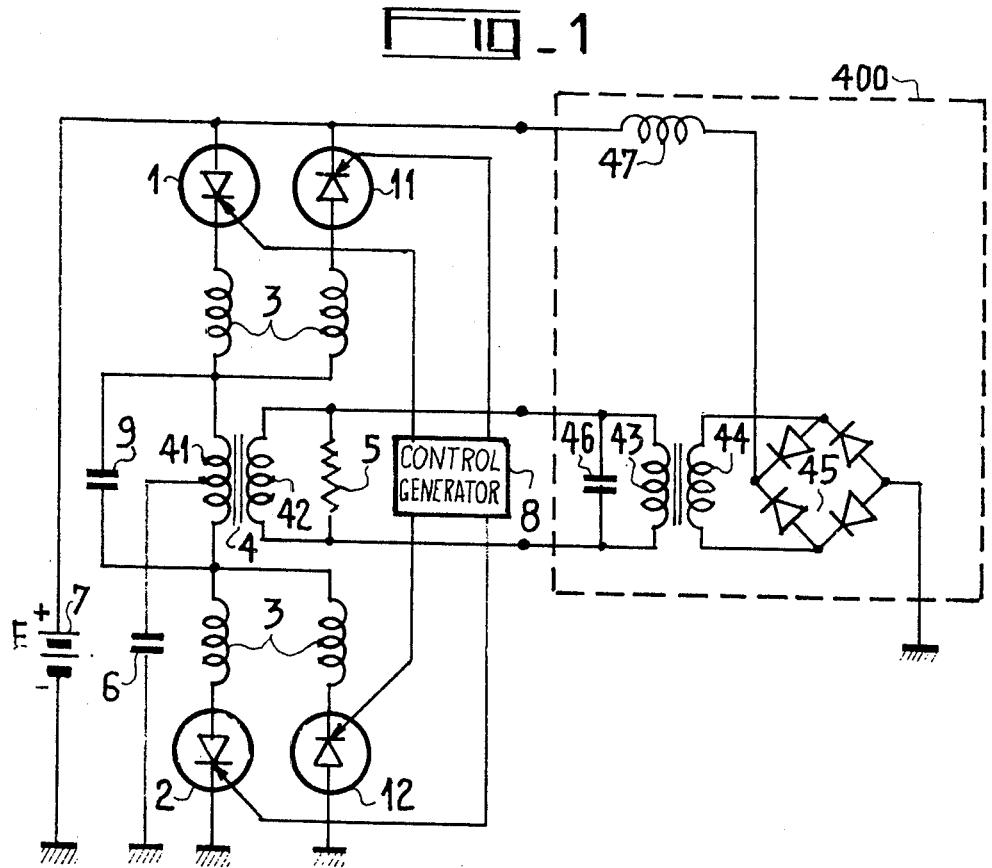
FIG. 1 : a circuit diagram of an inverter incorporating protection means according to the present invention.

For convenience in these figures the reference numerals of the above cited French patent have been retained and other references have been used for new elements.

Figure 2:
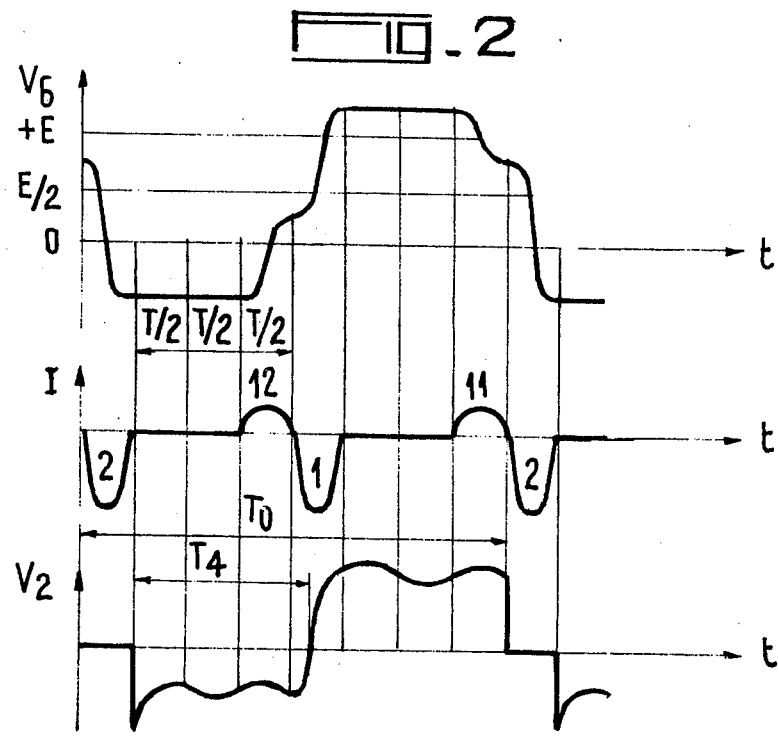
FIG. 2 : time diagrams illustrating currents and voltages at different points in the inverter.
Figure 4:
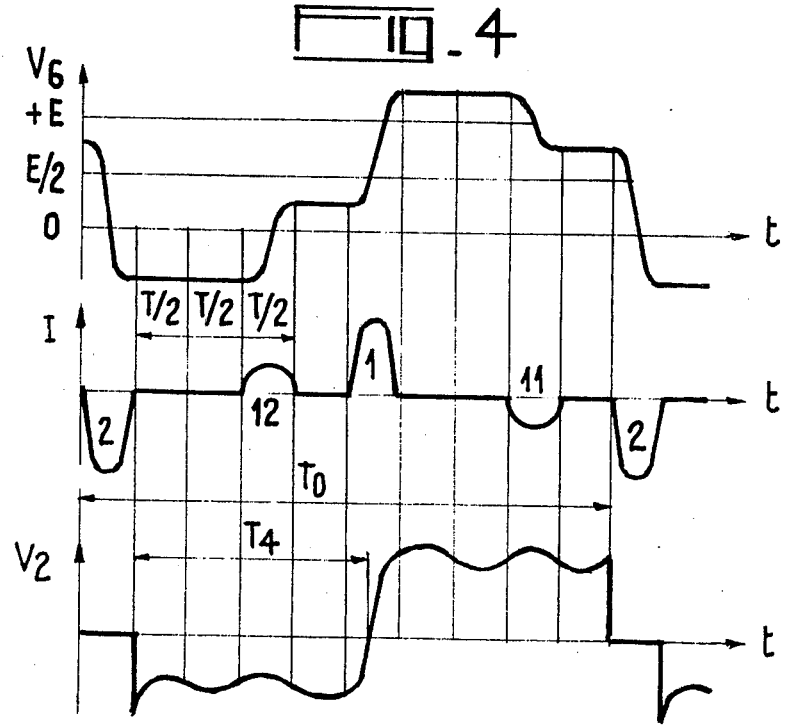
FIG. 4 : time diagrams of the corresponding currents and voltages for the circuit diagram in FIG. 3.

In FIGS. 1 and 3, appear elements which are added to the prior art embodiment disclosed in the cited patent as a result of the modifications made to the circuits for improvements provided by the present invention; FIGS. 2 and 4 are time diagrams which show currents and voltages at various points in the inverters illustrated.

These modifications consist chiefly in connecting, in parallel with the series combination formed by a controlled rectifier 1 and an inductance 3, a combination formed by a controlled rectifier 11 in series with another inductance 3, and in connecting a second combination formed by a controlled rectifier 12 and an inductance 3 in parallel with a series combination formed by a rectifier 2 and another inductance 3, with rectifiers 11 and 12 conducting in the opposite direction from rectifiers 1 and 2.

Rectifiers 11 and 12 are advantageously identical to recitifiers 1 and 2 and they are triggered by pulses which are supplied by a trigger signal generator 8. Such a circuit combines two rectifiers connected in opposite directions, i.e. in a back-to-back connection, the combination being capable of operating to conduct current in both directions.

In the inverters described in the cited patent when a load 5 connected to the output terminals of the inverter was for example short-circuited at each produced signal half-cycle, the voltage $V_6$ at the terminals of capacitor 6 underwent a cumulative increase and there was thus a danger of its causing the destruction of certain components, in particular the rectifier components.

In inverters according to the present invention, this cumulative effect no longer exists since, if in a first phase capacitor 6 is charged by one of the rectifiers in the back-to-back connection, rectifier 1 for example, in the next phase the other rectifier 11 will discharge it. The same applies to rectifiers 2 and 12.

As shown by the waveforms for the voltage $V_6$ at the terminals of capacitor 6, for the current I in load 5, and for the voltage $V_2$ at the terminals of rectifier 2, all of which are shown in FIGS. 2 and 4, the operation of inverters according to the present invention is different from that of a conventional inverter having two pairs of controlled rectifiers, since in the conventional inverter each pair operates independently of the others.

The same result is achieved with the inverter shown in the circuit diagram in FIG. 3, as illustrated in FIG. 4.

Furthermore, a fault-detecting protective circuit 400 is connected in parallel with the resistive load 5 (FIG. 1) of the inverter. The circuit is formed by a resonant circuit having an inductance 43 with a capacitor 46 across its terminals and tuned to the output frequency of the inverter generated A.C. signal; said resonant circuit in normal operation, is damped by the resistive load 5 and thus presents at resonance a low Q factor.

The resonant circuit 43, 46 is inductively and closely coupled to an inductance 44 which is connected to opposite ends of a diagonal of a diode rectifier bridge 45. The two ends of the other diagonal of the bridge are respectively connected on the one hand to earth and on the other hand to the positive pole of a source 7 of DC voltage E via a current limiting inductance 47.

In normal operation, resonant circuit 43, 46 is damped by the resistive load 5. The energy transferred to inductance 44 is thus too low to allow the voltage which is rectified by bridge 45 (a voltage made up of positive-going (half-cycles) and which is returned to source 7 via inductance 47, to exceed the voltage E from the source.

When the value of the load become infinite, for example as a result of disconnection, the Q factor of inductance 43 increases considerably and the voltage rectified by bridge 45 become very much greater than that from source 7. Energy is fed back to the source.

The thyristors in the inverter continue to operate with no change from normal circumstances and as a result of their switching cycles they cause energy to be fed back to the DC supply source until the fault in the load has been remedied.

In a simplified and modified embodiment of the protective circuit, inductance 44 is formed by a separate winding on the output transformer 4 of the inverter.

It may also be mentioned that an indicator lamp can be provided in the fault detecting circuit to signal a disconnection in the load circuit.

It is understood that, although this description has only dealt with the case in which the number $m$ of pairs of rectifiers is 2, a similar result would be obtained when $m = 2q$ with a $q$ representing a whole number greater than or equal to 1.

Of course, the invention is not limited to the embodiments described and shown, which were given solely by way of example.

What is claimed as new and desired to be secured by letters patent of the United States is:

1. In a D.C. to A.C. power inverter having input terminals connectable to a source of direct current; output terminals connectable to an alternating current load; first circuit means for connecting the input and output terminals, the first circuit means including a first pair of controlled rectifiers connected through first and second inductors; and a capacitor coupled to the midpoint between the first and second inductors and to a ground or reference potential, second circuit means for connecting the input and output terminals, the second circuit means including a second pair of controlled rectifiers, each controlled rectifier in the second pair of controlled rectifiers being connected across a respective controlled rectifier in the first pair of controlled rectifiers and poled in the opposite direction thereto;

a detector having its output connected to the input terminals; and means tuned to the frequency of the alternating current and having a Q factor dependent upon the magnitude of the impedance of the alternating current load for coupling the input of the detector to the output terminals.

2. The D.C. to A.C. power inverter recited in claim 1 wherein:

the detector is a diode rectifier bridge having its output pair of junctions connected to the input terminals and its input pair of junctions connected to the coupling means.

3. The D.C. to A.C. power inverter recited in claim 2 wherein the coupling means includes:

an inductance connected across the input pair of junctions of the bridge; and a resonant circuit inductively coupled to the inductance.

4. The D.C. to A.C. power inverter recited in claim 2 wherein the coupling means includes:

a transformer having a winding connected across the input pair of junctions of the bridge.

* * * * *